Dec. 31, 1935.  O. U. ZERK  2,026,338
CASING FOR JOINTS
Filed April 12, 1932  2 Sheets-Sheet 1
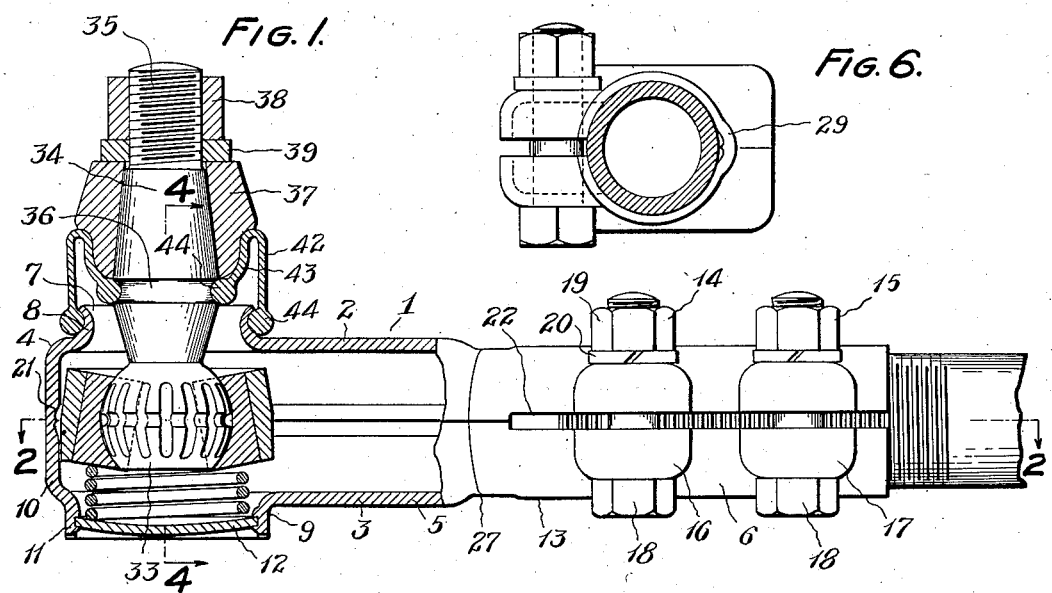
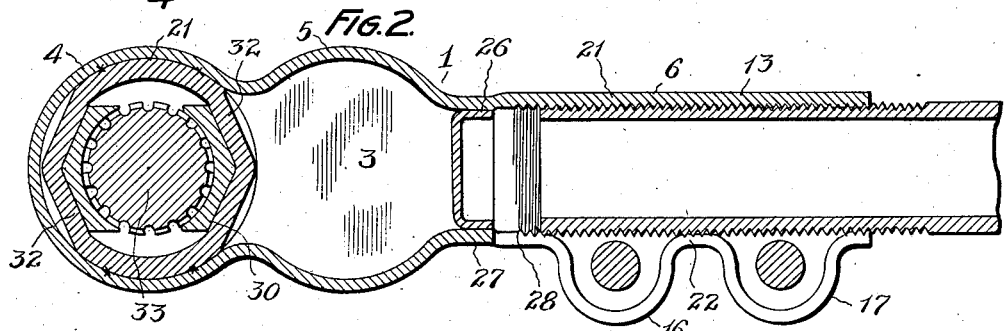
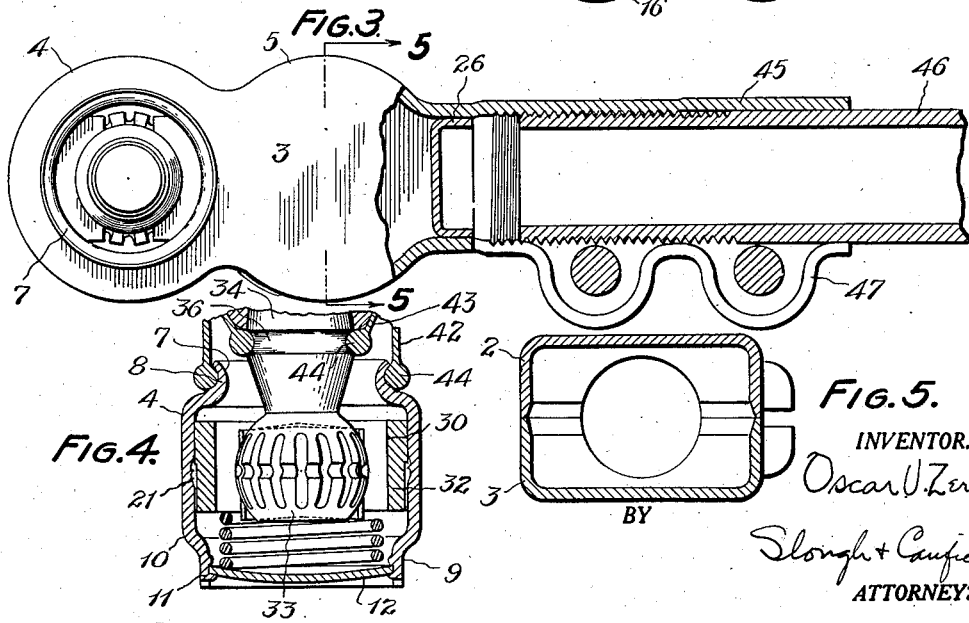
INVENTOR.
Oscar U Zerk
BY
Slough + Canfield
ATTORNEYS.

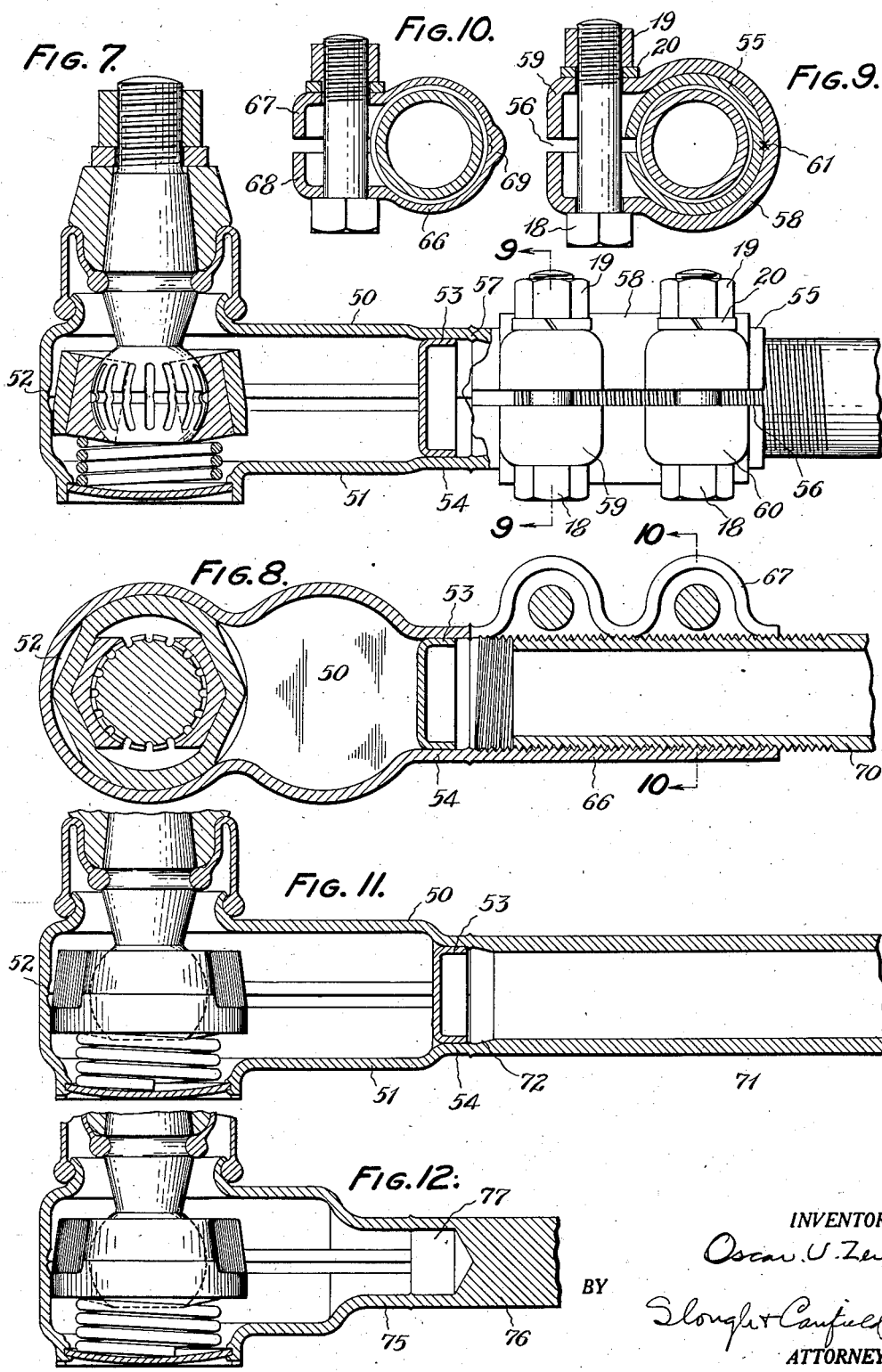

Patented Dec. 31, 1935

2,026,338

UNITED STATES PATENT OFFICE 2,026,338

CASING FOR JOINT

Oscar U. Zerk, Cleveland, Ohio

Application April 12, 1932, Serial No. 604,781

11 Claims. (Cl. 287—90)

My invention relates generally to casings for joints, and particularly to sheet metal casings for universal joints such as tie rods or drag link joints used in connection with the steering mechanism of an automobile.

Such casings have heretofore been usually made of malleable iron or the like and have necessitated relatively expensive machine operations such as threading, milling, and boring. I contemplate a relatively light casing of exceptional strength adapted to effectively absorb the thrust exerted thereagainst by the enclosed bearing elements.

The universal joint shown and described in connection with the casing and which is more fully described in my co-pending application, Serial No. 604,779 filed April 12, 1932, now patented, No. 1,928,919, is preferably employed but it is understood that any type joint to which the housing is adapted may be used.

It is an object of my invention, therefore, to provide an improved casing for universal joints such as tie rod or drag link joints, which will possess exceptional strength and yet be relatively light in weight.

Another object of my invention is to provide an improved casing for universal joints such as tie rod or drag link joints used as linkage elements in steering mechanism, which is susceptible of manufacture by relatively inexpensive stamping and welding operations.

Another object of my invention is to provide an improved casing for universal joints and the like, adapted to effectively absorb the forces exerted thereagainst by the enclosed bearing elements.

Another object of my invention is to provide an improved casing for universal joints and the like, adapted to be effectively sealed against the ingress of foreign substances.

Another object of my invention is to provide an improved casing for universal joints such as used with tie rod or drag link connections for the steering mechanism of a vehicle, which can be easily and quickly assembled.

Another object of my invention is to provide an improved casing for universal joints and the like, provided with means for adjustably securing a tie rod or the like thereto.

Other objects of my invention and the invention itself will become more apparent from a consideration of the accompanying description and drawings wherein—

Fig. 1 is a fragmentary longitudinal view, partially in section showing a universal joint casing which is a preferred embodiment of my invention;

Fig. 2 is a horizontal sectional view taken along the line 2—2 of Fig. 1;

Fig. 3 is a plan view of the casing and clamping means partially in section, and illustrating a modification of my invention;

Fig. 4 is a fragmentary transverse sectional view taken along the line 4—4 of Fig. 1;

Fig. 5 is a transverse sectional view taken along the line 5—5 of Fig. 3 before welding sections together;

Fig. 6 is an end elevational view showing the clamping means;

Fig. 7 is a longitudinal view, partially in section of a modification of my invention;

Fig. 8 is a horizontal sectional view of another modification of my invention;

Fig. 9 is a tranverse sectional view taken along the line 9—9 of Fig. 7;

Fig. 10 is a transverse sectional view taken along the line 10—10 of Fig. 8;

Fig. 11 is a vertical longitudinal sectional view of another modification of my invention; and, Fig. 12 is a vertical, longitudinal sectional view of another modification of my invention.

Referring to Figs. 1, 2, 4, 5, and 6 wherein I show a preferred embodiment of my invention, the casing generally indicated at 1 comprises the generally similar, complementary cup sections 2 and 3. The section 2 preferably formed of a sheet metal stamping is generally rectangular in cross section and is provided with a generally circular end wall 4 merging into the generally semi-circular walls 5 which terminates in the preferably semi-circular jaw 6. The section 2 is flared outwardly in the top wall thereof to form a collar 6 concentric with the end wall 4 and provided with an external preferably semi-circular groove 8.

The section 3 is complementary to and generally similar to the section 2 and is provided with a collar 9 concentric with the generally circular end walls 10 thereof, the collar 9 being provided with a circular recess 11 adapted to have a dished closure plate 12 inserted therein and sealingly secured by flanging over spaced peripheral portions of the collar. The section 3 terminates in a clamping jaw 13 similar to clamping jaw 6 of section 2.

The clamping jaws 6 and 13 are formed with generally confronting cup-shaped lugs indicated at 14, 15 on section 2 and 16, 17 on section 3. The lugs are provided with apertures within which are disposed bolts 18 secured by nuts 19 and lock washers 20, whereby any desired clamping pressure may be exerted. Threads of any desired pitch and generally indicated at 21 are stamped in the inner wall of the semi-cylindrical clamping jaw 6 and complementary threads are stamped in the clamping jaw 13 of section 3, the thread in jaw 13 being a half pitch advanced or retarded dependent on whether or not a right or left-hand thread is used and forms a continuation of the thread in the clamping jaw 6 of section 2.

The abutting edges of the casing are internally beveled as indicated at 21 for a purpose to be later described.

The sections 2 and 3 can be completely formed in one stamping operation with the slot indicated at 22 adapted to provide adjustment for the clamping means being formed either partially within one section.

Prior to securing the sections 2 and 3 together, a tapered ring 25 is rigidly secured to the section 3, preferably by spot welding. The sections 2 and 3 are placed confrontingly together with their corresponding edges abutting and with the clamping jaws 6 and 13 abutting as indicated at 29 and also along a throat portion 27. A resilient threaded plug 28 having the same number and pitch of threads as the stamped threads in the casing jaws is disposed as indicated in Fig. 3 to ensure that the threads of the upper and lower jaws will be properly aligned during the welding operation. The sections 2 and 3 and the clamping jaws are then weldingly secured together along their abutting edges preferably by electric welding. As indicated in Fig. 6 the abutting edges of the clamping jaws are flared outwardly at 29 sufficiently to ensure that the flash created during the welding operation will be disposed outwardly of the external surface of a tube or the like engaging the clamping jaws.

The inner wall of the throat portion 27 is then reamed to ensure that a circular cap 26 placed therein will effectively seal the throat of the casing.

The abutting beveled edges 21 of the sections 2 and 3 provide room for the flash created during the welding operation and also ensure a relatively smaller area to transmit the welding current, thereby providing greater resistance to the passage of the current and permitting of a higher fusing temperature.

The ring 25 is sufficiently tapered or converges in an upward direction so that there is no tendency to contact section 2 and short circuit the welding current.

Shoes 30 engage oppositely disposed converging faces 32 of ring 25 and rotatably support a ball 33 of a bearing element provided with a shank 34 having a relatively reduced threaded end 35. The shank is provided with a groove 36 for a purpose to be hereinafter described. An eye 37 of a steering arm or the like, encircles the shank and is secured thereon by a nut 38 and washer 39. The shoes 30 are compressively supported by a spring 40 which seats upon the dished plate 12. Features and details of the joints are more fully described in my aforementioned co-pending application.

The shank 34 is sealed with the casing by a flexible sealing element 42 preferably formed of synthetic rubber which is generally cylindrical and is provided with a re-entrant portion 43 having a ring 44 generally circular in cross section, constrictingly engaging the shank at the groove 36 therein. The portion 42 is provided with a generally similar ring 44 constrictingly engaging the collar 9 of the housing. The shank 34 will thus be able to move universally and remain effectively sealed to the casing.

The casing as described obviates the necessity of relatively expensive machine operations, such as threading, drilling, boring, and milling as would be required in the usual malleable iron or the like casing. The usual slotting operation required and which is also relatively expensive is effected by the stamping operation. The casing is thus relatively strong, the parts are inexpensively and quickly formed, and are quickly and inexpensively assembled. The casing is effectively sealed against the ingress of foreign material which might cause an abrasive action between the bearing elements or to provide an effective lubricant chamber if desired. The clamping jaws are especially adaptable to tie rods and the like which require adjustment and which must be securely locked in any adjusted position.

Referring to Fig. 3, I show a modification of the casing illustrated in Figs. 1, 2, 4, 5, and 6, which is generally similar thereto with the exception that the ends of the clamping jaws are slightly enlarged as indicated at 45 so that the internal diameter of the walls will be greater than the external diameter of the threads of a tie rod or the like indicated at 46. This means that it will only be necessary to stamp threads in a portion of the clamping jaws and that the outer clamping lugs 47 when drawn together will exert pressure on a cylindrical, non-threaded surface.

Referring to Figs. 7 and 9 I have shown another modification of my invention wherein sections 50 and 51 are generally similar to sections 2 and 3 hereinbefore described but are separately formed rather than having integral clamping jaws. The sections are weldingly secured together along their abutting edges at 52 and a cap 53 is sealingly secured in a cylindrical throat 54 of the casing. An internally threaded tube 55 longitudinally slotted as indicated at 56 is then secured to the sections 50 and 51 at the throat portion 54 preferably by butt-welding as indicated at 57. A second slotted tube 58 provided with integral confronting clamping lugs 59 and 60 is disposed over tube 55 and secured thereto preferably by spot welding at spaced intervals along the engaging surfaces opposite the slotted walls of the tube as indicated at 61. The lugs 59 are preferably rectangular in cross section in order that they may be relatively strong and yet be formed by a stamping operation prior to bending the tube 58 into its cylindrical form. The lugs 59 and 60 are provided with aligned bolt apertures in order that clamping pressure may be exerted thereon by bolts 18 disposed therein in a manner previously described.

Referring to Figs. 8 and 10, I show a modification of my invention wherein the casing is similar to that described in connection with Figs. 7 and 9 but a modified form of clamping jaws is employed. In this modification clamping jaws 65 and 66 are pressed to a generally semi-cylindrical form with spaced clamping lugs 67 and 68 formed therein, and with threads pressed in the internal walls thereof adapted to form a continuous helical thread when secured together as previously described.

The jaws are flared outwardly as indicated at 69 in order that the flash created during the welding operation will be disposed outwardly of the external diameter of a tube 70 adapted to threadedly engage the clamping jaws. A threaded plug 28 is inserted between the clamping jaws prior to and during the welding operation to ensure that the threads will be in proper alignment as previously described. A plug 53 is tightly secured within the throat 54 of the casing prior to welding the clamping jaws to the casing. In all the modifications described I employ a plug similar to the plug 53 to sealingly secure the casing end and to ensure that the plug may be tightly secured within the throat of the casing I prefer to make the internal diameter of the casing throat slightly smaller than the internal diameter of the clamping jaw threads to permit a reamer or the like to be inserted between the clamping jaws whereby the throat may be reamed to eliminate the flash formed during the process of welding the casing sections together.

In the modification wherein the clamping jaws are not formed integral with the casing sections but are later welded thereto, the casing throat is not necessarily made smaller than the internal diameter of the clamping jaws thread but it is still necessary to ream the throat to permit a cap to be tightly secured therein. In Fig. 11 I have illustrated another modification of my invention wherein the casing sections 50 and 51 and the cap 53 are the same as described in connection with Figs. 7 and 9, but wherein I weldingly secure a non-threaded tubular shaft 71 to the casing. The end of tube 71 at which it is secured to the casing is preferably flared outwardly as indicated at 72 in order that the abutting end of the casing throat 54 and the tube 71 which are to be weldingly secured together, may have the same area to permit an even distribution of the weld. If the areas were not substantially the same, the larger area would tend to dissipate the welding heat at a faster rate which would mean a relatively inefficient weld.

Referring to Fig. 12, I have shown a modification of my invention, which is generally similar to that described in connection with Fig. 11 wherein the throat 75 of the casing is lengthened and the casing chamber relatively reduced. In this modification I weldingly secure a rod 76 to the casing throat preferably by butt-welding, the rod being recessed as indicated at 77 in order that the abutting ends of the rod and the casing throat which are to be secured together may have substantially the same area for reasons previously pointed out.

In all the modifications of my invention shown and described I prefer that the stamped threads in the clamping jaws shall not comprise a full depth thread but will be substantially flattened at the tip. This permits of the use of a thinner gauge metal, materially reduces the pressure required to press the threads into the metal and prevents distortion of the tubular element, and provides a slight space intermediate the top of the thread of the root of the engaging thread to permit raising of metal therebetween. I preferably stamp or press the threads in the various cylindrical or semi-cylindrical jaws when in a common plane and prior to bending to a tubular or semi-tubular form.

Although I have shown and described embodiments of my invention I contemplate that numerous and extensive departures may be made therefrom without departing from the spirit and scope of my invention and the appended claims. Having thus described my invention what I claim is:—

1. A casing for universal joints and the like comprising a pair of sections generally of channel form, and closed at one end, the sections having the character of concave sheet metal stampings, the two sections being joined together along the side and closed end edges thereof providing a casing closed at one end and having an inwardly extending ridge along the juncture, and an element formed to support a bearing member joined to the inner wall of one of the sections and overlapping the edge joint and spaced from the joint to clear the inwardly projecting ridge.

2. A casing for universal joints and the like comprising a pair of sections generally of channel form, and closed at one end, the sections having the character of concave sheet metal stampings, the two sections being joined together along the side and closed end edges thereof providing a casing closed at one end, and having an inwardly extending ridge along the juncture, a section having adjacent the closed end of the casing, an inwardly concave wall portion, a generally tubular element formed to support a bearing member and having an outwardly convex wall portion seated in the concave wall portion of said sections and joined thereto and overlapping the edge joint and spaced therefrom to clear the inwardly projecting ridge.

3. A casing for universal joints and the like comprising a pair of sections generally of channel form, and closed at one end, the sections having the character of concave sheet metal stampings, the two sections being integrally joined together along the side and closed end edges thereof providing a casing closed at one end and having an inwardly extending ridge along the juncture, a section having adjacent the closed end of the casing, an inwardly concave wall portion, a generally tubular element in the casing formed to support a bearing member and having an outwardly convex wall portion seated in the concave wall portion of the said section and joined thereto and overlapping the edge joint and spaced therefrom to clear the inwardly projecting ridge, and the casing sections having, respectively, perforations in opposite walls thereof, generally coaxially aligned with the generally tubular element.

4. A casing for universal joints and the like comprising a pair of sections generally of channel form, and closed at one end, the sections having the character of concave sheet metal stampings, the two sections being joined together along the side and closed end edges thereof providing a casing closed at one end, a generally tubular element in the casing formed to support a bearing member and having a wall portion joined to a wall portion of one of the sections, one of the casing sections having a perforation in the wall thereof generally coaxially aligned with the generally tubular element, and the peripheral portion of its perforation being formed with an annular sealing surface.

5. A casing for universal joints and the like comprising a pair of sections generally of channel form and closed at one end, the sections having the character of concave sheet metal stampings, the two sections being joined together along the side and closed end edges thereof providing a casing closed at one end, the casing having a throat portion spaced from the closed end of the casing providing a chamber for lubricant between the closed end and the throat portion, a plug element closing the throat portion, and outwardly beyond the throat portion the casing having a longitudinally slotted generally cylindrical tubular internally threaded portion.

6. A casing for universal joints and the like comprising a pair of sections generally of channel form, and closed at one end, the sections having the character of concave sheet metal stampings, the two sections being joined together along the side and closed end edges thereof providing a casing closed at one end, the casing having a throat portion spaced from the closed end of the casing, a plug element closing the throat portion, and outwardly beyond the throat portion the casing having a longitudinally slotted generally cylindrical tubular internally threaded portion, the slot being provided by longitudinally extending unjoined edge portions, one edge portion being inwardly offset from a said stamped section side edge.

7. A casing for universal joints and the like comprising a pair of sections generally of channel form, and closed at one end, the sections having the character of concave sheet metal stampings, the two sections being electrically welded together along the side and closed end edges thereof, providing a casing closed at one end the casing opposite the closed end having a generally cylindrical tubular longitudinally slotted internally threaded extension, the slot being provided by longitudinally extending unjoined edge portions, one edge portion being inwardly offset from a said stamped section side edge.

8. A casing for universal joints and the like comprising a pair of sections generally of channel form and closed at one end, the sections having the character of concave sheet metal stampings, the two sections being integrally joined together along the side and closed end edges providing a casing closed at one end, the open end of the casing terminating in a generally cylindrical tubular longitudinally slotted internally threaded portion, the slot being provided by longitudinally extending unjoined edge portions, one edge portion being inwardly offset from a said stamped section side edge, the sections being respectively provided, adjacent the slot edges, with concavely confronting laterally extending bolt receiving threaded-portion constricting lugs.

9. A casing for universal joints and the like comprising casing sections having the character of concavely press-formed sheet metal blanks and the sections be joined together along confronting edge portions thereof, the casing as a whole comprising a generally cylindrical tubular internally threaded portion provided by concavely confronting part cylindrical portions of the casing sections, each portion having parallel thread grooves therein, those of each section supplementing those of the other to define a continuous spiral groove, the grooves having the character of diagonal parallel grooves pressed in flat metal and bent into part cylindrical form.

10. A casing for universal joints and the like comprising casing sections having the character of concavely press-formed sheet metal blanks, and the sections being joined together along confronting edge portions thereof, the casing as a whole comprising a generally cylindrical tubular internally threaded portion provided by concavely confronting part cylindrical portions of the casing sections, each portion having parallel thread grooves therein, those of each section supplementing those of the other to define a continuous spiral thread groove, the grooves having the character of diagonal parallel grooves pressed in flat metal and bent into part cylindrical form, and the cylindrical tubular casing portion being provided with a longitudinally extending slot provided by longitudinally extending unjoined edge portions of the concave casing sections, one of the unjoined edge portions being an inwardly offset portion of the confronting edge of one of the casing sections.

11. A casing for universal joints and the like comprising casing sections having the character of concavely press-formed sheet metal blanks, and the sections being joined together along confronting edge portions thereof, the casing as a whole comprising a generally cylindrical tubular internally threaded portion provided by concavely confronting part cylindrical portions of the casing sections, each portion having parallel thread grooves therein, those of each section supplementing those of the other to define a continuous spiral groove, the grooves having the character of parallel diagonal grooves pressed in flat metal and bent into part cylindrical form, and the cylindrical tubular casing portion being provided with a longitudinally extending slot provided by longitudinally extending unjoined edge portions of the concave casing sections, one of the unjoined edge portions being an inwardly offset portion of the confronting edge of one of the casing sections, and the sections being respectively provided adjacent the slot edges with concavely confronting laterally extending bolt-receiving threaded-portion constricting integral lugs.

OSCAR U. ZERK.